United States Patent [19]

Dean et al.

[11] Patent Number: 5,268,616

[45] Date of Patent: Dec. 7, 1993

[54] VEHICLE INSTRUMENT PANEL LAMPS, IMPROVED PULSE WIDTH DIMMER SYSTEM THEREFOR

[75] Inventors: Patrick D. Dean, Armada; Abbas T. Sabbah, Sterling Heights, both of Mich.

[73] Assignee: Chrysler Corporation, Highland Park, Mich.

[21] Appl. No.: 895,068

[22] Filed: Jun. 8, 1992

[51] Int. Cl.⁵ .................................. B60Q 1/26
[52] U.S. Cl. ...................... 315/77; 315/209 R; 315/210; 315/224; 315/307
[58] Field of Search ............... 315/77, 209 R, 210, 315/224, 307; 362/61

[56] References Cited

U.S. PATENT DOCUMENTS

| | | | |
|---|---|---|---|
| 4,368,406 | 1/1983 | Kruzich et al. | 315/77 |
| 5,001,398 | 3/1991 | Dunn | 315/77 |
| 5,113,120 | 5/1992 | Scott et al. | 315/77 |

*Primary Examiner*—Robert J. Pascal
*Assistant Examiner*—Haissa Philogene
*Attorney, Agent, or Firm*—Wendell K. Fredericks

[57] ABSTRACT

A pulse width dimming system responsive to low frequency pulse width modulated signals of various duty cycles employs a single charging capacitor in a charge pump circuit connected between a voltage source and the output of an FET for developing voltage pulse signals for controlling current through a field effect transistor used to control the intensity of lamps in a vehicle instrument panel.

7 Claims, 3 Drawing Sheets

VEHICLE INSTRUMENT PANEL LAMPS, IMPROVED PULSE WIDTH DIMMER SYSTEM THEREFOR

BACKGROUND OF THE INVENTION

1. Field of the Invention

This invention relates to a pulse width modulated dimming system in a vehicle, and more particularly to an improved dimming system for manually controlling the dimming of the intensity of the light from the panel lamps with respect to full intensity using a pulse width modulated control signal.

2. Prior Art

In many systems, a field effect transistor controls the amount of current routed to the lamps in the instrument panel. A charge pump/voltage doubler network develops power for driving the FET.

In one prior system, a modest frequency pulse width modulated (PWM) signal stimulates the charging of a capacitor in the charge pump circuit. However, in using the modest frequency PWM signal, usually at least an extra inverting transistor circuit must initiate doubling the voltage across the charging capacitor in order to fulfill the charge pump operation and to keep the variable pulse voltage routed to the lamps in synchronization with the VPWM signal from a microcontroller.

Realizing the need to reduce components in a vehicle and keeping cost of components in vehicles at a minimum without sacrificing performance, a search was initiate for various means to provide control over PWM dimming of lamps. This search resulted in the improved PWM dimming system of the present invention.

SUMMARY OF THE INVENTION

The invention discloses a microcontroller that provides a low frequency PWM signal. This PWM signal, used in conjunction with a discrete component charge pump circuit, develops a suitable high voltage signal for controlling the time a PWM signal applies to a plurality of panel lamps connected to the output terminal of a FET. In addition to using the output signal of the FET to power the lamps, this signal initiates charging of a charging capacitor in the charge pump circuit.

The discrete component circuit also contains failsafe provisions for inhibiting the circuit in the event of the occurrence of a faulty PWM signal or an MCU reset signal.

IN THE DRAWINGS

DETAILED DESCRIPTION OF A PREFERRED EMBODIMENT

Figure 1:
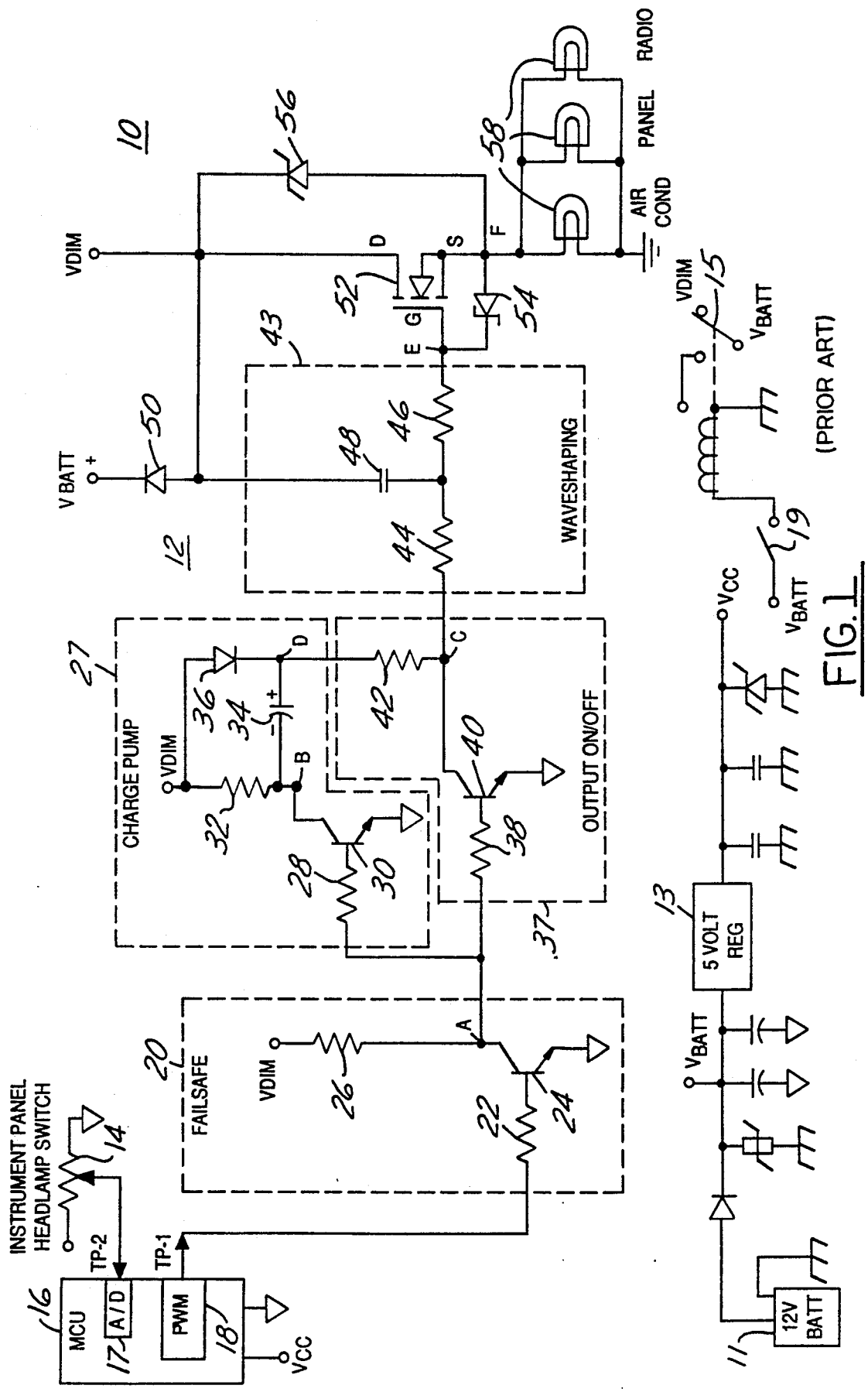
FIG. 1 illustrates in a partial pictorial, partial schematic diagram of a prior art pulse width dimming system.

FIG. 1 illustrates in a partial pictorial, partial schematic diagram, a prior art vehicle Lamp Intensity Control System 10 described in a co-pending patent application Ser. No. 07/855,975 filed Mar. 31, 1992 by the present inventors entitled "Vehicle Instrument Panel Lamps, Pulse Width Dimmer System Therefor" and now abandoned that includes a pulse width dimming (PWD) module 12. This system permits dimming and brightening the panel lamps 58–58 within an instrument panel and console of the vehicle.

Battery power (VBATT) for the system emanates from a 12 VDC vehicle battery 11. A power relay 15 connected across battery 11 by instrument panel light switch 19 provides dimming voltage (VDIM) for powering PWD module 10. Also, battery 11 supplies power to a conventional 5 VDC regulator 13 used to provide power to MCU 16.

An instrument panel dimmer control potentiometer 14, connected to TP-2 of MCU 16, adjustable between OFF or ground and fully ON, allows an operator to adjust a control signal to an analog to digital (A/D) converter 17 within microcontroller unit (MCU) 16 located in the instrument panel. The digital signal from the A/D converter 17 regulates the duration of the 5 VDC pulses from PWM circuit 18 in MCU 16. Illustratively, the duty cycle of a 122 Hz PWM signal can vary from 10%–99%. This manually varied duration PWM signal routes to an input circuit of the PWD module 12.

The PWM signal from MCU 16, having an amplitude of e.g. 5 VDC goes to a failsafe circuit 20 of PWD module 12. The PWM signal enters module 12 through one end of a resistor 22, connected to TP-1 of MCU 16, and travels to the base of a NPN transistor switch 24. Providing the failsafe feature, transistor 24 cuts off if PWM 18 ceases to function or MCU 16 goes into reset mode. Cutting off transistor 24 inhibits operation of the output ON/OFF circuit 37 as well as the succeeding circuits. Otherwise, transistor 24 acts as an inverter and level shifter providing 12 VDC pulses at terminal (A) of an opposite polarity from that at TP-1 of MCU 16.

The level-shifted pulse signal at terminal A routes along two paths. One path goes to the base of transistor 30 of the charge pump circuit 27 via base resistor 28 and the other path goes to the base of transistor 40 of the output ON/OFF circuit 37 via base resistor 38. Pulse signals at collector terminal (B) of Transistor 30 switch between 0 and 12 VDC and appear opposite in polarity to the signal at terminal A.

Pulse signals at terminal (C) of transistor 40 switch between 0 and 24 VDC in response to the same opposite polarity signal at terminal A and the potential difference developed at terminal D due to charging and discharging of capacitor 34.

Initially, with transistor 30 switched ON, the positive terminal of capacitor 34 charges to the potential of VDIM or 12 VDC via diode 36. When transistor 30 switches OFF, the negative terminal of capacitor 34 switches directly to 12 VDC also. But since the potential difference across capacitors do not instantaneously change, the voltage at the positive terminal of capacitor 34 switches to 24 VDC with respect to the 12 VDC at the negative terminal maintaining the potential difference across capacitor 34 at 12 VDC.

With diode 36 reversed, biased by the amplitude of the pulse voltage at terminal D, the potential difference at terminal D switches between 12 and 24 VDC.

The collector voltage at terminal C of transistor 40 tends to follow the alternations, but producing amplitudes around 20.2 VDC. Transistor 40 acts as a buffer to the incoming PWM signal from MCU 16 and a second failsafe electronic switch in the event a fault in the PWM signal or a reset mode of the MCU occurs.

Capacitor 48 and resistors 44 and 42 form an integrator circuit of waveshaping circuit 43 for stabilizing and shaping the pulse signal at terminal C. The pulse signal at terminal C provides the input voltage signal to the integrator and the voltage across capacitor 48 provides the output signal. The output voltage at terminal E rises and falls between 0 and about 20.2 VDC in response to the pulse signal at terminal C in accordance with the exponential equations associated with conventional integrator circuits. A conventional reversed bias diode 50 provides spike protection to circuit 43.

The voltage at terminal E applies to the gate terminal of field effect transistor (FET) 52, an enhancement mode temperature protected type unit. While the shaped pulse signal at the gate or terminal E of FET 52 varies between 0 and 20.2 VDC in response to the pulse signal routed through resistor 46, illustratively, an 8.2 volt zener diode 54 limits the gate to source terminal voltage to 8.2 VDC+Vsource or approximately 20.2 VDC.

As the pulse widths of the voltage pulses at terminal E increases, the pulse widths of the output voltage pulses or source voltage at terminal F also increases; hence, the illumination of lamps 58-58 increases. As the pulses terminal E voltage pulses decrease, lamp illumination decreases. Extinguishing of lamps 58-58 occurs when the duty cycle of the voltage at terminal F goes to zero.

AN IMPROVED EMBODIMENT OF A VEHICLE LAMP DIMMING SYSTEM

Figure 2:
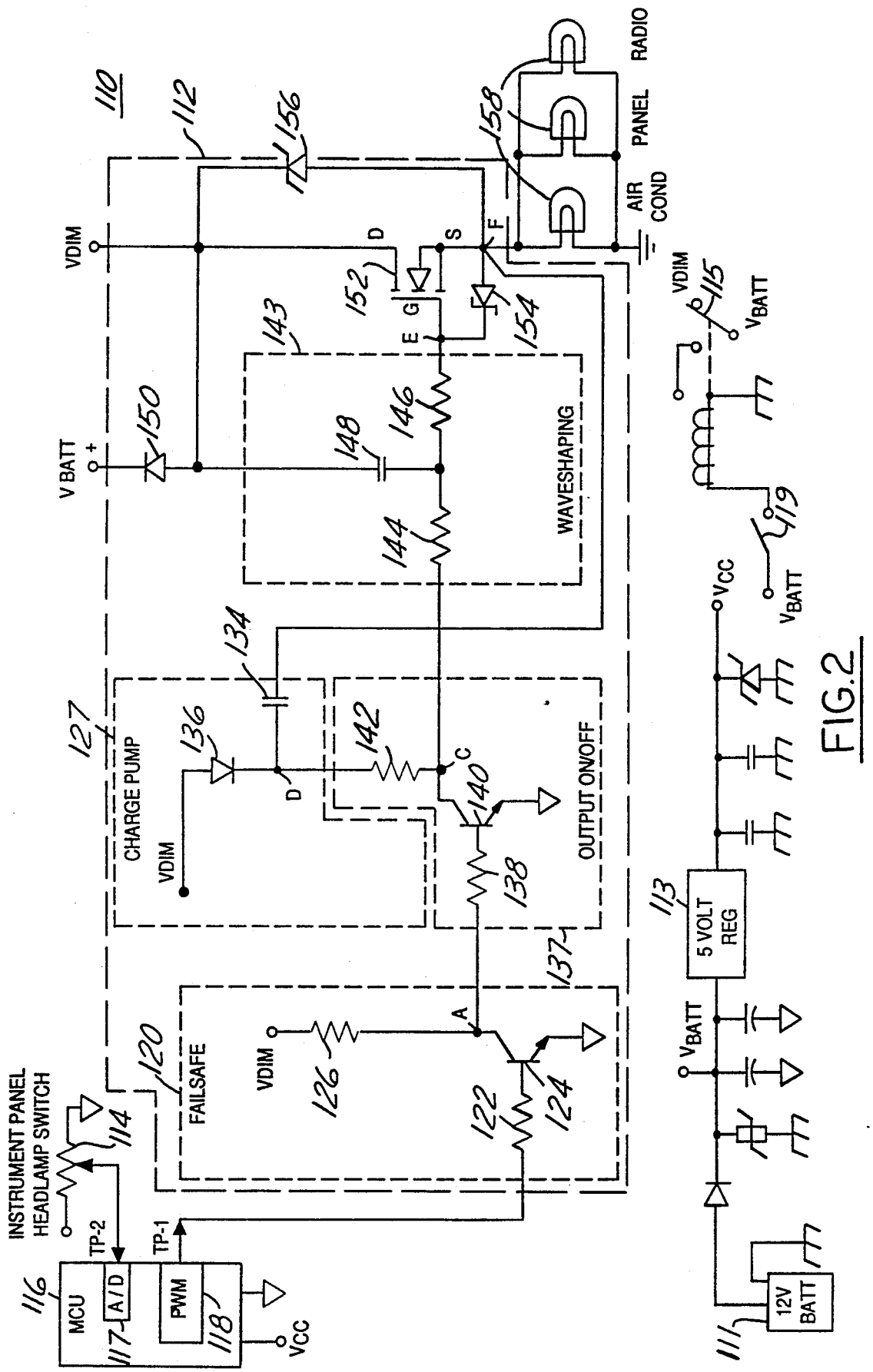
FIG. 2 depicts in a partial pictorial, partial schematic diagram of the improved pulse width dimming system of the present invention.

FIG. 2 illustrates in a partial pictorial, partial schematic diagram, an improved vehicle Lamp Intensity Control System 110 of the present invention that includes a pulse width dimming (PWD) module 112. (Note the figure numerals in FIG. 2 are the same as those in FIG. 1, but increased by 100 for like components.) This system uses a minimum number of circuits to affect dimming and brightening of panel lamps 158-158 within the instrument panel and console of the vehicle.

SYSTEM POWER SOURCE

As with the system of FIG. 1, battery power (VBATT) for the system emanates from a 12 VDC vehicle battery 111. A power relay 115 connected across battery 111 by instrument panel light switch 19 provides dimming voltage (VDIM) for powering PWD module 110. Also, battery 111 supplies power to a conventional 5 VDC regulator 113 used to provide power to MCU 116.

MCU CIRCUITS

An instrument panel dimmer control potentiometer 114, connected to TP-2 of MCU 116, adjustable between OFF or ground and fully ON, allows an operator to adjust a control signal to an analog to digital (A/D) converter 117 within microcontroller unit (MCU) 116 located in the instrument panel. The digital signal from the A/D converter 117 regulates the duration of the 5 VDC pulses from PWM circuit 115 in MCU 116. Illustratively, the duty cycle of a 122 Hz PWM signal can vary from 10%-95%. This manually varied duration PWM signal routes to an input circuit of the PWD module 112.

DIMMING MODULE CIRCUITS

This PWM signal from MCU 116, having an amplitude of e.g., 5 VDC goes to a failsafe circuit 120 of PWD module 112. The PWM signal enters module 112 through one end of a resistor 122, connected to TP-1 of MCU 116, and travels to the base of a NPN transistor switch 124. Providing the failsafe feature, transistor 124 cuts off if PWM 118 ceases to function or MCU 116 goes into reset mode. Cutting off transistor 124 inhibits operation of the output ON/OFF circuit 137 as well as the succeeding circuits. Otherwise, transistor 124 acts as an inverter and level shifter providing 12 VDC pulses at terminal (A) of an opposite polarity from that at TP-1 of MCU 16.

CHARGE PUMP AND OUTPUT ON/OFF CIRCUIT

The pulse signal at terminal A routes to the base of transistor 140 of the output ON/OFF circuit 137 via base resistor 138. Transistor 140 switches ON and OFF in response to the opposite polarity signal at terminal A. Illustratively, pulse signals at terminal (C) of transistor 140 switch between 0 and 24 VDC in response to the signal at terminal A and the potential difference developed at terminal D due to charging and discharging of capacitor 134. However, capacitor 134 charges and discharges in response to pulses at the source terminal of field effect transistor (FET) 152.

Initially, with transistor 140 turned ON, the first terminal of capacitor 134 connected to the cathode of diode 136 goes to a potential difference of about 12 VDC with respect to the potential difference of 0 VDC at terminal F of FET 152. When transistor 140 turns OFF, the gate voltage of FET 152 goes to about 20 VDC turning ON the FET causing the source terminal to go to 12 VDC for the duration of the PWM signal. This source terminal signal routes to the second side of capacitor 134 causing a change of potential across the capacitor. But since the potential difference across capacitors do not instantaneously change, the voltage at the first terminal of capacitor 134 switches to about 24 VDC, with respect to the 12 VDC at the second terminal, maintaining the potential difference across capacitor 134 at 12 VDC for the duration of the PWM signal.

If the voltage pulse at terminal D rises to 24 VDC, the potential differential at terminal C rises to about 24 VDC also for the same duration providing the necessary turn ON voltage pulse at the gate of FET 152.

WAVE SHAPING CIRCUIT

Capacitor 148 and resistors 144 and 142 form an integrator circuit of waveshaping circuit 143 for stabilizing and shaping the pulse signal at terminal C. The pulse signal at terminal C provides the input voltage signal to the integrator and the voltage across capacitor 148 provides the output signal. The output voltage at terminal E rises and falls between 0 and about 20.2 VDC in response to the pulse signal at terminal C in accordance with the exponential equations associated with conventional integrator circuits. A conventional reversed bias diode 150 provides spike protection to circuit 143.

TEMPERATURE PROTECTED N-CHANNEL MOSFET

The pulse voltage at terminal E applies to the gate terminal of FET 152, an enhancement mode temperature protected type unit. While the duration of the shaped pulse signal at the gate or terminal E of FET 152 varies OFF and nearly fully ON, the duration of the output pulses at terminal F varies likewise.

As the duration of the voltage at terminal E increases, the duration of the output voltage at terminal F also increases; hence, the illumination of lamps 158-158 increases. As the duration of the terminal E voltage decreases, lamp illumination decreases. Extinguishing of lamps 158-158 occurs when the duty cycle of the pulses at terminal F goes to zero.

TIMING DIAGRAMS

Figure 3:
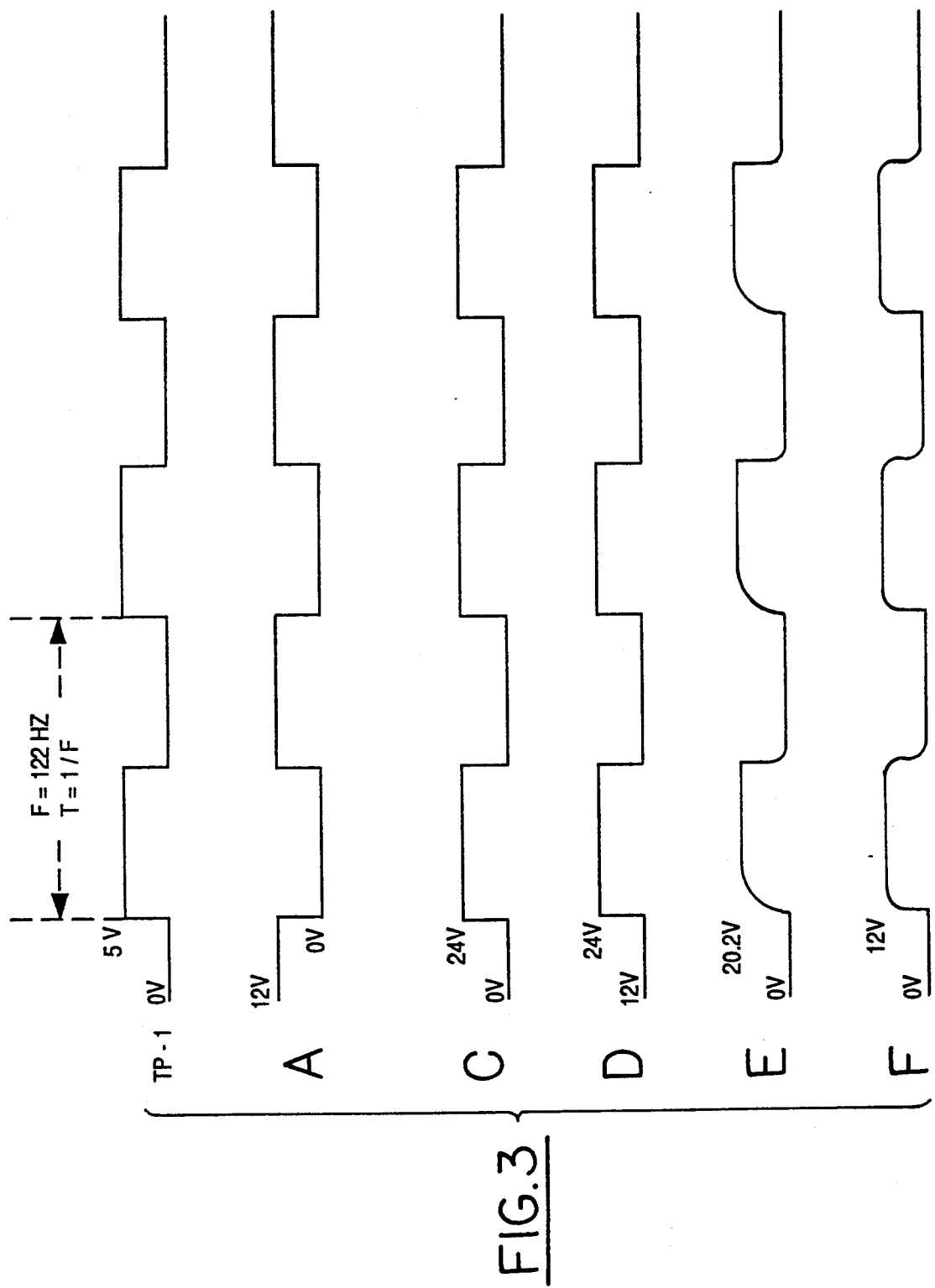
FIG. 3 (A and C–F) illustrates waveforms of the pulse signals at designated terminals within the improved pulse width dimming system depicted in FIG. 2.

To further explain the operation of system 110, refer now to the timing diagrams of FIGS. 3.

FIG. 3 (A and C-F) depicts voltage waveforms resulting from a 50% duty cycle PWM signal at TP-1 of MCU 116. FIG. 3-A depicts the inverted pulse signal at terminal A of the failsafe circuit 120. FIG. 3 (D and F) shows the voltage difference across capacitor 134 at terminals D of the charge pump circuit 37 and terminal F of FET 152, respectively.

FIG. C illustrates the waveform at terminal C of the output ON/OFF circuit 137; and FIG. E depicts the voltage pulses at the gate of FET 52.

When an operator adjusts the PWM signal at TP-1 for a 50% duty cycle, the lamps 58-58 will dim at $\approx \frac{1}{2}$ maximum intensity; for 25% duty cycle, will dim to $\approx \frac{1}{4}$ maximum intensity; and for 75% duty cycle will dim to $\approx \frac{3}{4}$ maximum intensity, and so on.

Microcontroller 16 may be a Motorola unit such as one of the 68HC05 families of controllers; FET 52 may be a MODEL BTS 130 from the Siemens Corporation; the transistors may be conventional NPN 2N3904's and the lamps may rate as a 5 amp load.

I claim:

1. An improved pulse width modulation (PWM) lamp dimming system in a vehicle instrument panel for furnishing a lamp illumination mode of operation with selectable variable dimming states with respect to substantially full illumination of a plurality of lamps in the instrument panel, the dimming system being energized from a source voltage of electrical potential difference coupled to (1) a voltage regulator device for supplying a source of regulated power of a chosen amplitude; and (2) an instrument panel lamp switch and relay for applying the variable pulse widths of the voltage pulses to the dimming system when desirous of manual control of illumination of the lamps of the instrument panel, said dimming system comprising:

(a) an instrument panel potentiometer mounted on said panel for providing a manually controlled signal referenced to said source of regulated power which can vary between fully OFF to a maximum signal level for adjusting the amount of dimming of said instrument panel lamps;

(b) a microcontroller unit (MCU), including an analog to digital converter (A/D) circuit and a pulse width modulation (PWM) circuit, receiving regulated power from said voltage regulator and having an input terminal port of said A/D converter that receives control signals from said potentiometer used to produce an internal control signal for adjusting the pulse width and duty cycle of an output pulse signal of a chosen frequency from said PWM circuit;

(c) a pulse width dimming (PWD) module circuit connected to receive the PWM signals from said microcontroller for developing a failsafe, waved shaped, charged pump type modified PWM signal in response to the duty cycle of the incoming PWM signal; and (d) a n-channel field effect transistor (FET) coupled between said PWD module and said plurality of instrument panel lamps for providing various levels of current to said lamps and voltage pulses of an amplitude of the source voltage to the PWD module in response to the duty cycle of the PWM signal.

2. Apparatus, in accordance with claim 1, wherein said PWD module includes a failsafe circuit having a combined inverter and level shifter coupled to receive the PWM signal from said MCU and for passing a level shifted PWM signal to an output terminal during normal operation but inhibiting passing the PWM signal to the output terminal if the PWM signal ceases or said MCU goes in a reset mode.

3. Apparatus, in accordance with claim 2, wherein said PWD module also includes an output ON/OFF circuit having another combination inverter and level shifter for receiving an inverted PWM signal and producing at an output terminal another inversion, but further amplified of the PWM signal for turning OFF and ON the FET.

4. Apparatus, as recited in claim 3, wherein said PWD module also includes a charge pump circuit having a first terminal of a charging capacitor coupled to the source voltage and to the output of the output ON/OFF circuit and having a second terminal of the charging capacitor connected to a source terminal of the FET, the voltage pulses at the source terminal of the FET providing a reference voltage pulse to the charging capacitor used to substantially increase the charging voltage during periods when the output ON/OFF circuit is ON.

5. Apparatus, as recited in claim 4, wherein said PWD module also includes a waveshaping circuit for accepting the output pulse signal from said charge pump circuit and producing at an output terminal an integrated pulse signal in response to the signal from said charge pump, the duty cycle of the integrated pulse signal being in proportion to the control signal from the potentiometer control signal routed to the A/D converter of said MCU.

6. Apparatus, as recited in claim 1, wherein said FET includes a first zener diode connected across a gate and source terminal for limiting the voltage at the gate terminal to a chosen voltage level and a second zener diode connected across the source and drain terminals of said FET for reducing the effects of supply voltage transient currents passing through said FET.

7. Apparatus, as recited in claim 1, wherein said frequency of said PWM signal is about 122 Hz.

* * * * *